(12) United States Patent
Jesse

(10) Patent No.: US 8,365,896 B2
(45) Date of Patent: Feb. 5, 2013

(54) CONVEYOR MOVER

(76) Inventor: Lynn Jesse, Urbandale, IA (US)

( * ) Notice: Subject to any disclaimer, the term of this patent is extended or adjusted under 35 U.S.C. 154(b) by 30 days.

(21) Appl. No.: 13/199,976

(22) Filed: Sep. 14, 2011

(65) Prior Publication Data
US 2012/0175218 A1   Jul. 12, 2012

Related U.S. Application Data

(63) Continuation-in-part of application No. 12/930,537, filed on Jan. 10, 2011, now Pat. No. 8,118,151.

(51) Int. Cl.
*B65G 21/00* (2006.01)
(52) U.S. Cl. ............ 198/315; 198/300; 280/767; 180/16
(58) Field of Classification Search .................. 198/300, 198/313, 315; 280/767; 180/16, 19.1; 414/326, 414/523
See application file for complete search history.

(56) References Cited

U.S. PATENT DOCUMENTS

| | | | | |
|---|---|---|---|---|
| 3,462,199 A * | 8/1969 | Downing et al. | ............. | 198/493 |
| 4,271,919 A * | 6/1981 | Vaughan | ......................... | 180/16 |
| 4,351,428 A * | 9/1982 | Long | .............................. | 198/302 |
| 4,359,117 A | 11/1982 | Vaughan | | |
| 4,603,775 A | 8/1986 | Plett | | |
| 4,650,058 A * | 3/1987 | Vaughan | ....................... | 198/304 |
| 4,714,149 A | 12/1987 | Tiede | | |
| 4,963,066 A | 10/1990 | Boppart | | |
| 5,318,444 A * | 6/1994 | Kuzub et al. | .................. | 414/326 |
| 7,191,889 B1 | 3/2007 | Heley | | |
| 7,488,149 B2 * | 2/2009 | Waldner | ....................... | 414/532 |
| 7,708,131 B2 | 5/2010 | Muth | | |
| 7,793,770 B1 * | 9/2010 | Schoonover et al. | ......... | 198/312 |
| 7,866,456 B2 * | 1/2011 | Bauman et al. | ............... | 198/311 |
| 8,118,151 B1 * | 2/2012 | Jesse | ............................. | 198/315 |
| 8,272,493 B1 * | 9/2012 | Grengs | ........................ | 198/300 |

OTHER PUBLICATIONS

Brandt Agricultural Products Ltd., PO Box 317 Station Main, 13th Ave. and Pinkie Road, Regina, SK, Canada S4P 3A1, brochure, 6 pages (date unknown).

* cited by examiner

*Primary Examiner* — James R Bidwell
(74) *Attorney, Agent, or Firm* — Dennis L. Thomte; Thomte Patent Law Office LLC

(57) ABSTRACT

A conveyor mover which may be used to move an auger conveyor or a belt conveyor from one location to another such as between grain bins. The mover is secured to the framework axle of the conveyor and is movable between a lower ground engaging position to an upper transport position. The mover includes at least one drive wheel which may be driven in either a forward direction or a rearward position. In one embodiment, a steer wheel assembly is secured to the conveyor tube adjacent the lower end thereof.

16 Claims, 6 Drawing Sheets

CONVEYOR MOVER

CROSS-REFERENCE TO RELATED APPLICATION

This application is a continuation-in-part of Applicant's earlier application and claims the benefit of application Ser. No. 12/930,537, filed on Jan. 10, 2011, now U.S. Pat. No. 8,118,151, entitled A GRAIN AUGER MOVER.

BACKGROUND OF THE INVENTION

1. Field of the Invention

This invention relates to a conveyor mover and more particularly to a remotely controlled conveyor mover which may be attached to the axle of the conveyor with the mover being selectively movable between operative and transport positions. Even more particularly, this invention relates to a conveyor mover which may be used with an auger type conveyor or a belt type conveyor with the conveyor being adapted to convey particulate material such as grain or the like.

2. Description of the Related Art

Conveyors for conveying particulate material such as grain are normally of the auger type or of the conveyor belt type. In either case, the conveyor includes an elongated conveyor tube having upper and lower ends, including either an auger therein or a conveyor belt which moves upwardly through the conveyor tube and thence downwardly by way of a return portion. The conveyor tube is supported by a framework including a transversely extending axle having a support wheel at each of its ends. When it is necessary to move the conveyor between grain bins or the like, the lower end of the conveyor must be manually raised from its operative grain conveying position so that the grain conveyor may be pulled, pushed or maneuvered to the desired location. The conveyors, whether they are grain augers or belt conveyors, are difficult to manually move.

Many types of devices have been previously provided for moving grain augers between grain bins. U.S. Pat. Nos. 4,526,265 and 4,512,687 utilize a farm tractor to move the grain auger but results in a very expensive tractor being tied up. The '265 and '687 patents also require very specialized mounts. U.S. Pat. Nos. 4,714,149 and 4,650,058 are very specialized and require specialized mounts. U.S. Pat. No. 7,588,107 utilizes tracks making the conveyor difficult to road transport. U.S. Published Application No. 2002/0125100 A1 discloses an all-terrain vehicle (ATV) for moving a conveyor but an all-terrain vehicle is expensive to purchase and ties up the vehicle for other use. Specialized mounts are also required.

In Applicant's co-pending application Ser. No. 12/930,537 filed Jan. 10, 2011, a grain auger mover is disclosed which is attached to the auger tube near the lower end thereof. Although the grain auger mover of the co-pending application works very well in most situations, there are times when the driven wheels of the mover do not have sufficient traction to move the grain auger since there may not be sufficient weight from the grain auger placed on the driven wheels.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A conveyor mover is disclosed which is designed to be used with a conveyor which may be an auger conveyor or which may be a belt conveyor. The conveyors are normally used to convey particulate material such as grain from a location outside a grain bin to the upper end of the grain bin.

The conveyor includes a conveyor tube having upper and lower ends and which is supported by a framework having an elongated transversely extending axle having a first support wheel rotatably mounted at one end thereof and a second support wheel rotatably mounted on the other end. The conveyor mover of this invention, sometimes referred to as a "tractor," includes a first support, having an upper end, a lower end, a rearward end and a forward end which is selectively removably attached to the axle of the conveyor framework between the first and second support wheels. In the preferred embodiment, the first support is selectively removably attached to the axle of the framework adjacent one of the first and second support wheels. The mover also includes a second elongated support having forward and rearward ends. The forward end of the second support is pivotally secured, about a horizontal axis which is parallel to the longitudinal axis of the conveyor framework, to the first support. The second support has a rotatable drive axle associated therewith which drive axle being parallel to the axle of the conveyor framework. At least one drive wheel, and preferably two drive wheels, are operatively connected to the drive axle for rotation therewith. A selectively reversible power means such as a battery powered gear motor, an electric motor, a gas engine or a diesel engine is mounted on the second support which is coupled to the drive axle so that the drive wheel or drive wheels on the drive axle may be driven in either a forward or reverse direction. In the preferred embodiment, the power means is remotely controlled. The mover of this invention also includes a length-adjustable jack having forward and rearward ends. The length-adjustable jack is extendable and retractable. The forward end of the jack is operatively pivotally secured to the first support about a horizontal axis. The rearward end of the jack is pivotally secured to the second support about a horizontal axis.

The extension of the jack causes the drive wheel or drive wheels on the drive axle of the mover to be lowered into a ground engaging position and whereby further extension of the jack applies downward pressure to the drive wheel or drive wheels on the drive axle to increase traction thereof with the retraction of the jack causing the drive wheel or drive wheels on the drive axle to be raised relative to the conveyor framework axle to a transport position. In the preferred embodiment, the drive wheel or drive wheels are lowered by the jack until the support wheel of the conveyor framework is lifted from the ground thereby applying sufficient weight to the drive wheel or drive wheels to provide sufficient traction.

In some cases, a pivotal steer wheel is secured to the lower end of the conveyor tube so that the conveyor may be maneuvered into the desired position.

It is therefore a principal object of the invention to provide an improved conveyor mover.

A further object of the invention is to provide an improved grain auger mover.

A further object of the invention is to provide a grain belt conveyor mover.

A further object of the invention is to provide a conveyor mover which is movable between a lowered operative position to a raised transport position relative to the axle of the conveyor framework.

A further object of the invention is to provide a conveyor mover of the type described which ensures that the drive wheel or drive wheels thereon will have sufficient traction to move the conveyor from one location to another.

A further object of the invention is to provide a conveyor mover of the type described which may be mounted on various makes of conveyors.

A further object of the invention is to provide a conveyor mover which is easily attached to a conventional conveyor whether it be of the grain auger type or the grain conveyor belt type.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
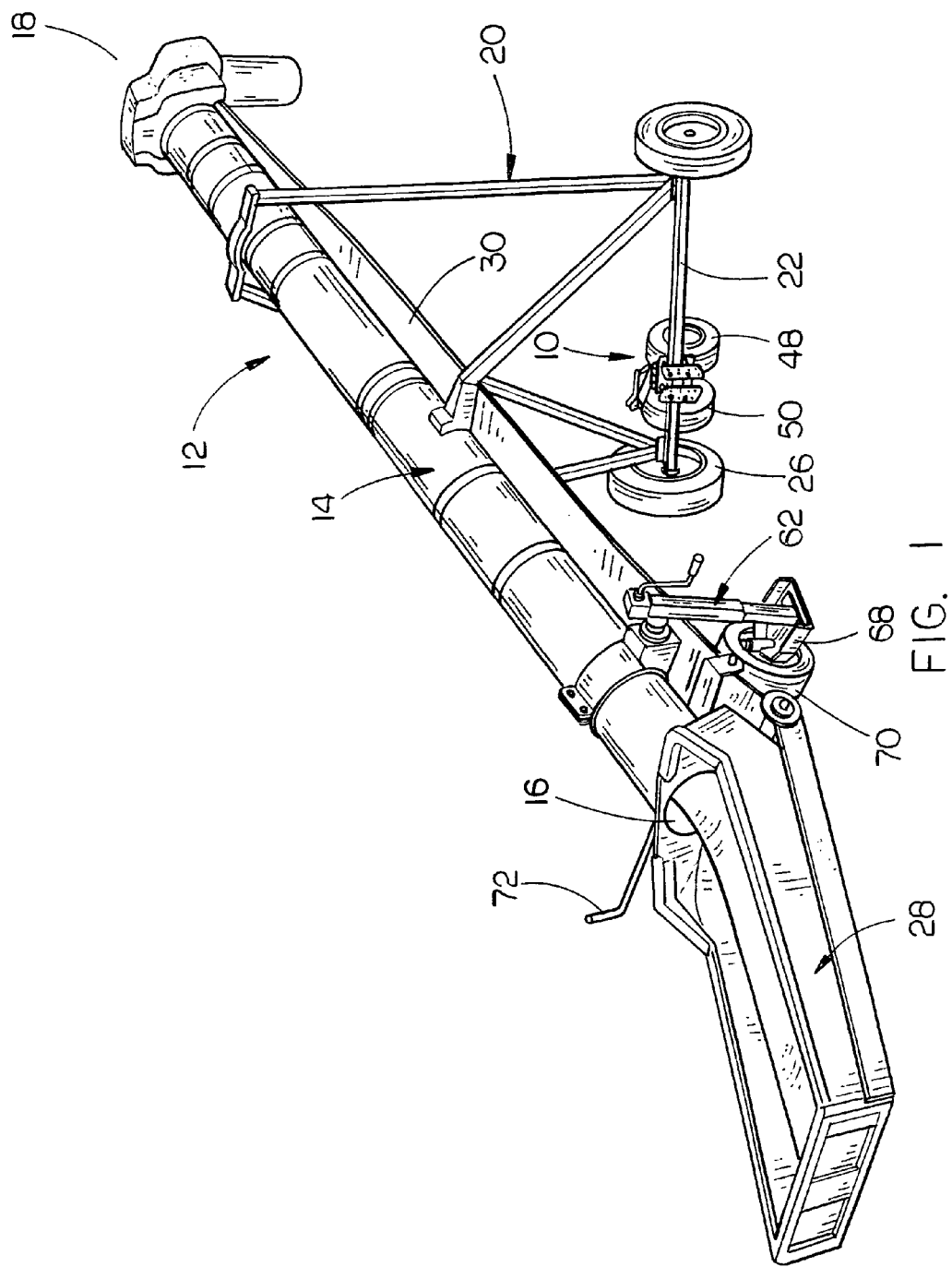
FIG. 1 is a perspective view of a belt conveyor having the conveyor mover of this invention mounted thereon and having a steer wheel assembly also mounted thereon.
Figure 2:
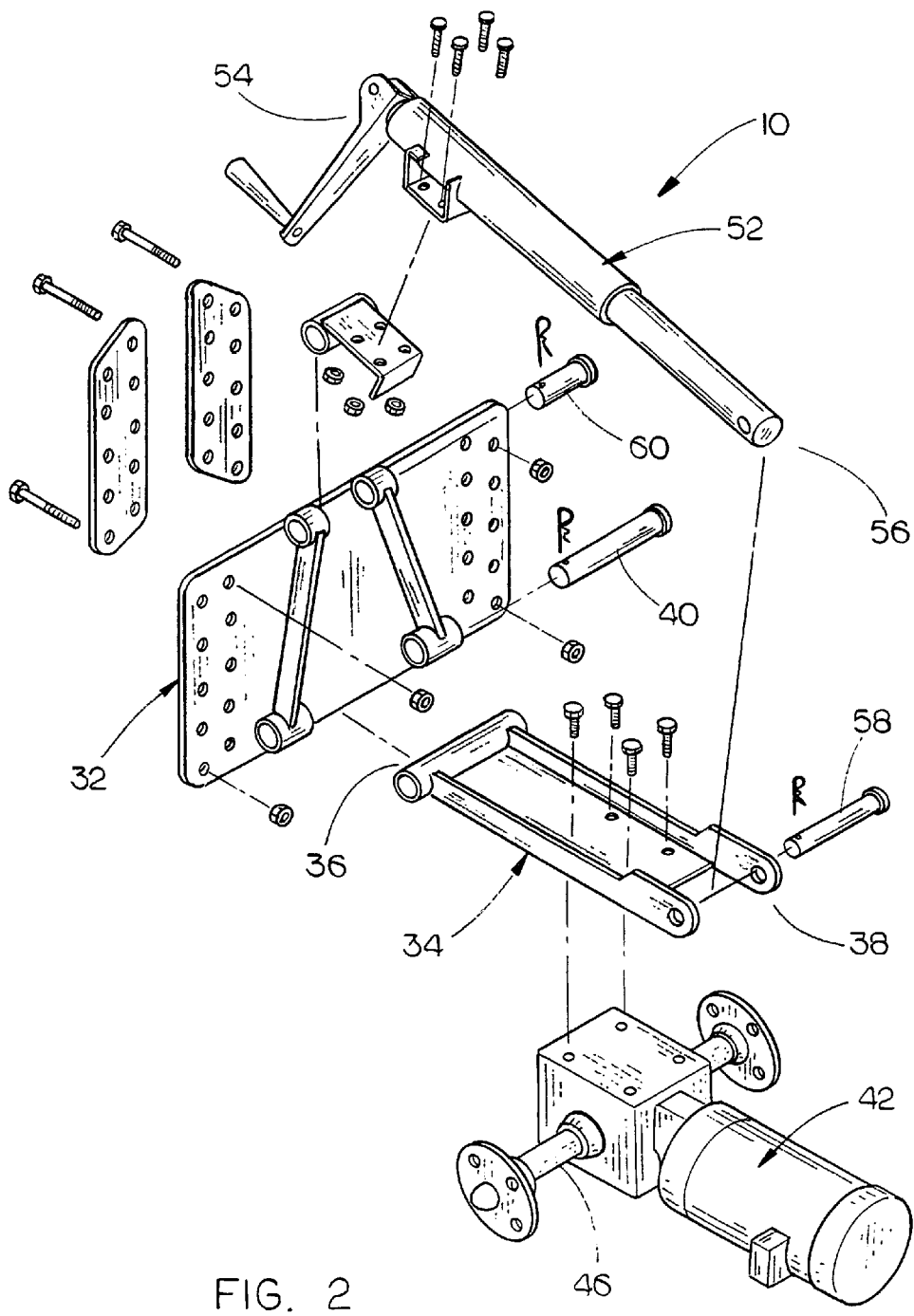
FIG. 2 is a partial exploded perspective view of the conveyor mover.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers generally to the conveyor mover of this invention which is designed to move a conveyor 12 either forwardly or rearwardly. The conveyor 12 may be a belt conveyor such as illustrated in the drawings or an auger conveyor such as disclosed in the co-pending application. In either case, the conveyor 12 may be used to convey particulate material such as grain from a lower position to an elevated position. Conveyor 12 includes a conveyor tube 14 having a lower intake end 16 and an upper discharge end 18. The conveyor tube is supported by an adjustable framework 20 which includes an elongated, transversely extending axle 22 having support wheels 24 and 26 rotatably mounted on the ends thereof. A hopper 28 is usually associated with the lower end of conveyor tube 14 in conventional fashion. Conveyor 12 includes a conveyor belt 30 which conveys grain or the like upwardly through conveyor tube 14 in conventional fashion and is driven by a power means in conventional fashion. Conveyor belt 30 after reaching the discharge end of conveyor tube 14 returns to the lower end of conveyor tube 14 beneath the conveyor tube 14 in conventional fashion. Mover or tractor 10, as it is sometime termed, includes a first upstanding support 32 which is selectively vertically adjustably secured to axle 22. Support 32 is preferably secured to axle 22 adjacent one of the support wheels for maximum traction and conveyor stability. The numeral 34 refers to an elongated second support having a forward end 36 and a rearward end 38. The forward end 36 of support 34 is pivotally secured to support 32 about a horizontal axis which is parallel to the longitudinal axis of axle 22 by means of a pivot pin or shaft 40.

The numeral 42 refers to a reversible battery powered gear motor. Although a gear motor is preferred, other sources of power such as an AC electric motor, gas engine, or a diesel engine could be substituted for gear motor 42. Gear motor 42 is electrically powered by a battery source 44 and is remotely controlled either by a hard wired connection or radio controlled. Gear motor 42 includes a drive shaft which rotates a drive axle 46. Preferably, a pair of drive wheels 48 and 50 are connected to the drive axle 46 for rotation therewith in either a forward direction or a rearward direction. A single drive wheel could also be utilized.

The numeral 52 refers to a conventional hand operated jack having a forward end 54 and a rearward end 56. Jack 52 is extendable and retractable in conventional fashion. The rearward end 56 of jack 52 is pivotally secured to support 34, about a horizontal axis, adjacent the rearward end thereof at 58. The forward end of jack 52 is operatively pivotally secured, about a horizontal axis, to the upper end of support 32 at 60.

Figure 3:
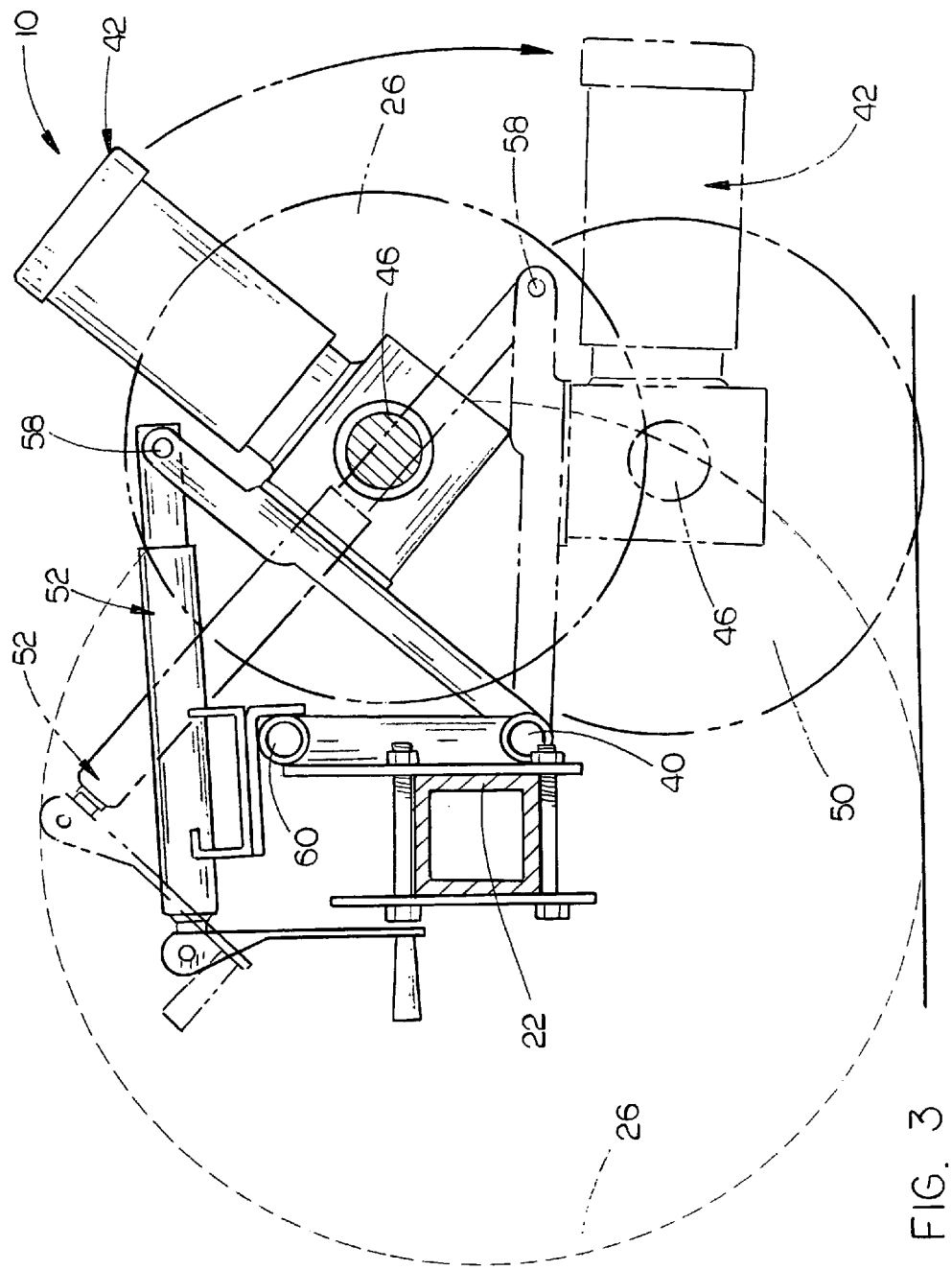
FIG. 3 is a partial side view of the conveyor mover in its transport position and which illustrates, in broken lines, the conveyor mover in its operative position.
Figure 4:
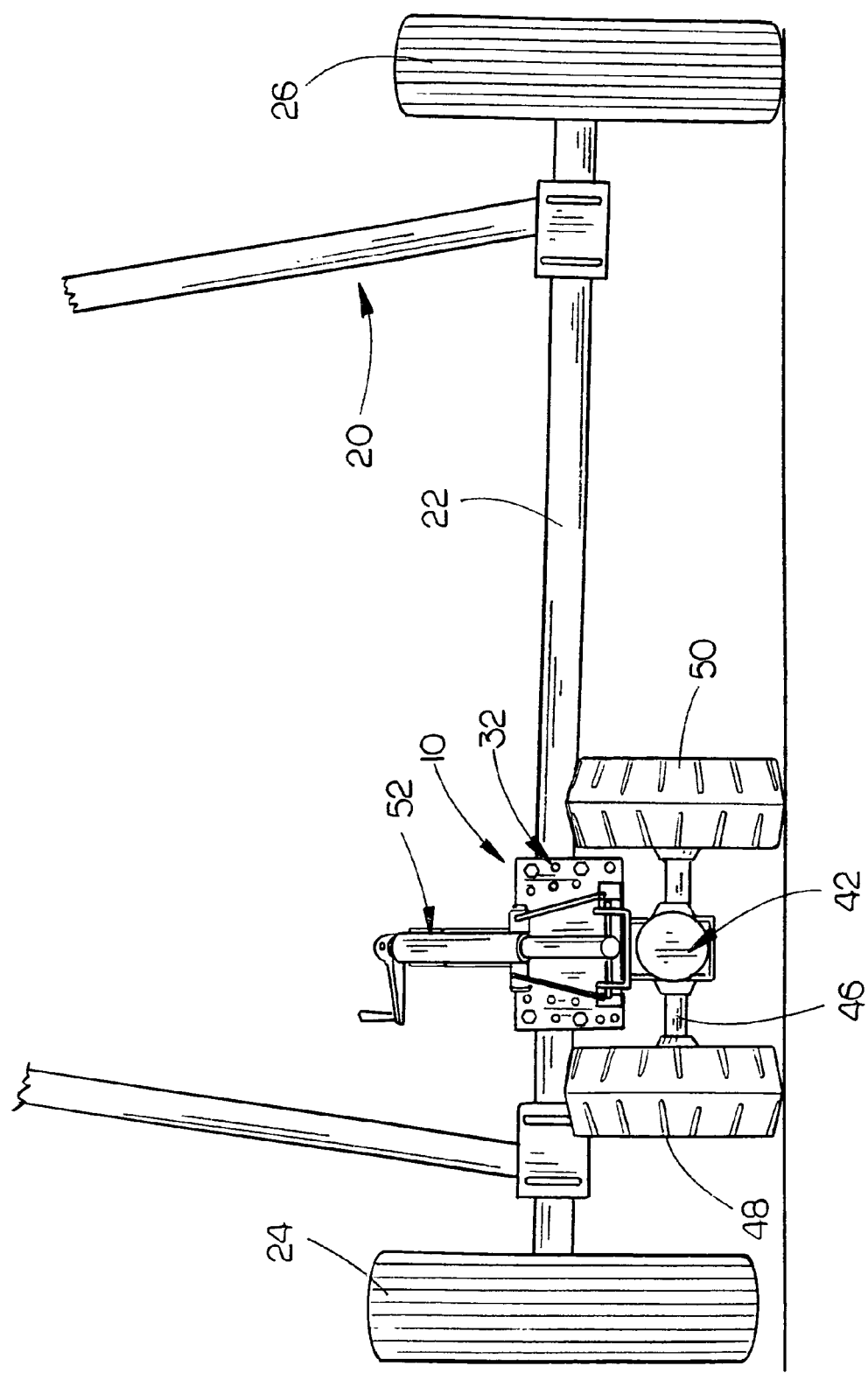
FIG. 4 is a rear view illustrating the conveyor mover in its operative position.
Figure 5:
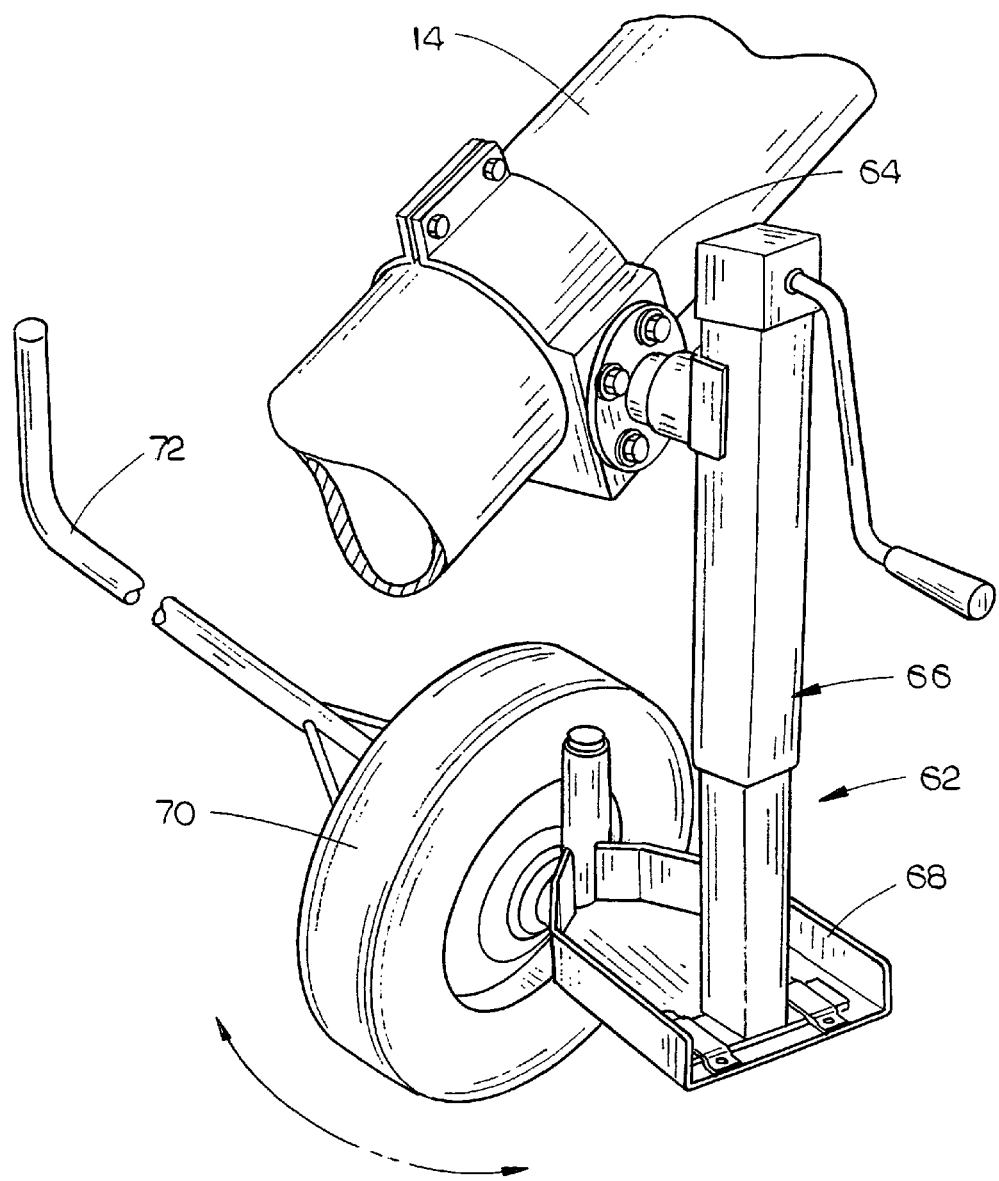
FIG. 5 is a perspective view of the steer wheel assembly.
Figure 6:
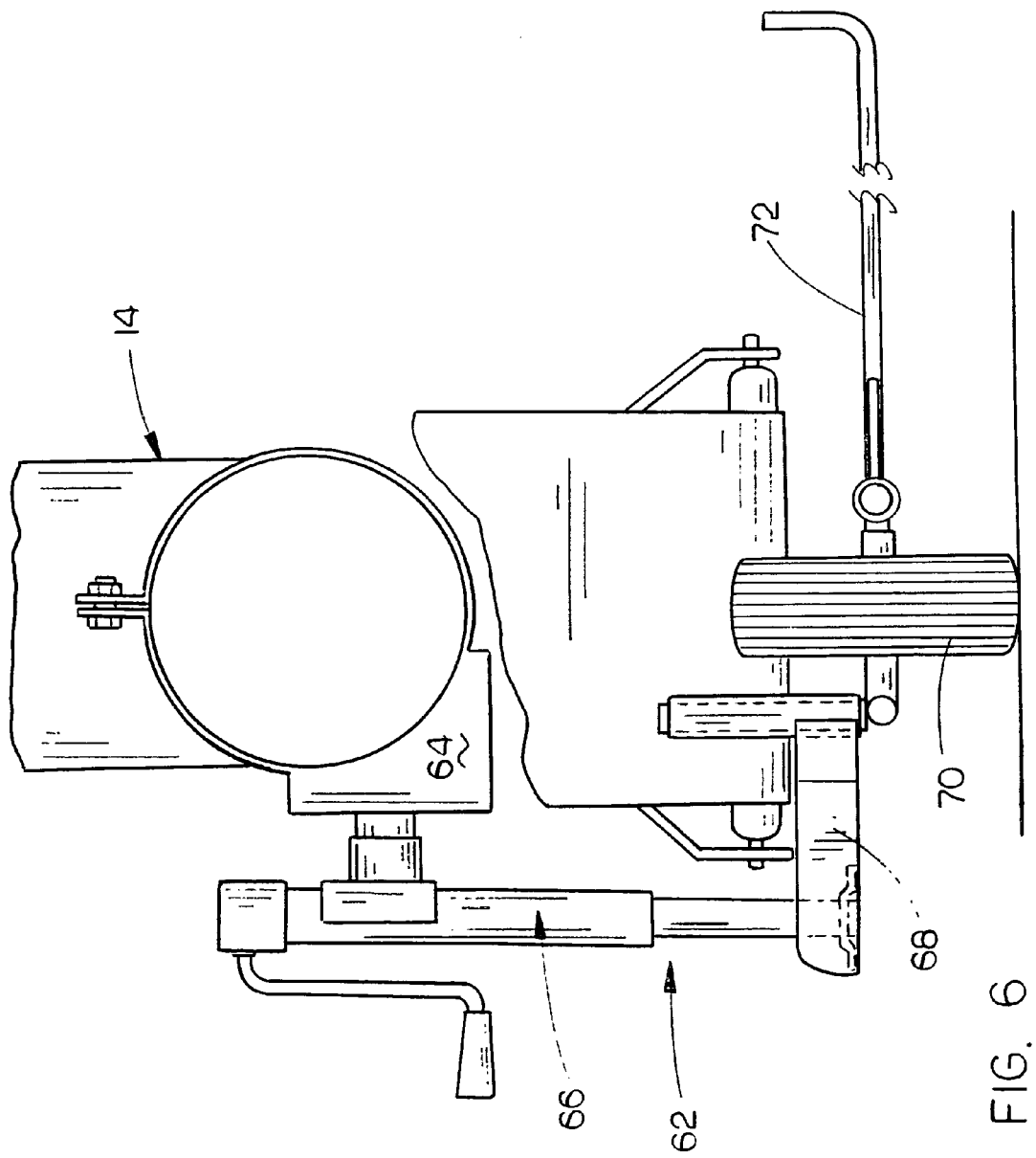
FIG. 6 is a rear view of the steer wheel assembly.

In use, the jack 52 may be retracted so that the drive wheels 48 and 50, second support 34, and gear motor 42 will be elevated to a transport position (FIG. 3) so that the conveyor may be transported to a distant location. When it is desired to move the conveyor 12 from one grain bin to another grain bin, the jack 52 is extended so that the drive wheels 48 and 50 are lowered to a ground engaging position. Further extension of jack 52 causes the support wheel adjacent thereto to be raised from the ground with a large amount of the weight on the framework 20 being transferred to the drive wheels 48 and 50 to increase the traction thereof. If the mover 10 was centered on axle 22, the framework 20 would tend to be unstable. When the drive wheels 48 and 50 are in their operative ground engaging position, the operator may lift the lower end of conveyor 12 from the ground, if the weight thereon is not excessive, actuate the gear motor 42 to move the conveyor 12 either forwardly or rearwardly while steering the conveyor from the raised lower end thereof.

If the weight on the lower end of the conveyor 12 prevents the operator from physically lifting the lower end thereof to steer the same during movement thereof, it is recommended that the steer wheel assembly 62 be used. Steer wheel assembly 62 includes a bracket or clamp 64 which is secured to conveyor tube 14 adjacent the lower end thereof. The upper end of jack 66 is secured to bracket 64 and extends downwardly therefrom. The lower end of jack 66 is secured to a steer wheel support 68 which extends inwardly therefrom. A steer wheel 70 is rotatably mounted at the inner end of support 68 and is also pivotally secured thereto about a vertical axis. An elongated steer wheel arm 72 is secured to steer wheel 70 and extends laterally therefrom to enable the steer wheel 70 to be pivoted by the arm 72. Thus, when mover 10 is actuated, the arm 72 may be manually moved to pivot steer wheel 70 to steer the same.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination with a conveyor, having upper and lower ends, supported by a framework including an elongated transversely extending axle having a first support wheel rotatably mounted at one end thereof and a second support wheel rotatably mounted on the other end, comprising:
   a first support, having an upper end, a lower end, a forward end and a rearward end, is selectively removably attached to the axle of the conveyor framework between the first and second support wheels;
   a second elongated support having forward and rearward ends;
   said forward end of said second support being pivotally secured, about a horizontal axis which is parallel to the longitudinal axis of the axle of the conveyor framework, to said first support;
   said second support having a rotatable drive axle rotatably mounted thereon with the drive axle being parallel to the axle of the conveyor framework;
   at least one drive wheel operatively connected to said drive axle for rotation therewith;
   a reversible power means mounted on said second support which is operatively coupled to said drive axle whereby said at least one drive wheel on said drive axle may be driven in either a forward or reverse direction;
   a length adjustable jack having forward and rearward ends;
   said length adjustable jack being extendable and retractable;
   said forward end of said jack being operatively pivotally secured to said first support about a horizontal axis;
   said rearward end of said jack being pivotally secured to said second support about a horizontal axis;
   the extension of said jack causing said at least one drive wheel on said drive axle to be lowered into a ground engaging position and whereby further extension of said jack applies downward pressure to said at least one drive wheel on said drive axle to increase the traction thereof with the retraction of said jack causing said at least one drive wheel on said drive axle to be raised relative to the conveyor framework axle to a transport position.

2. The combination of claim 1 wherein said first support includes means for vertically adjustably mounting said first support to the framework axle.

3. The combination of claim 1 wherein the conveyor is an auger conveyor.

4. The combination of claim 1 wherein the conveyor is a belt conveyor.

5. The combination of claim 1 wherein said first support is attached to the axle of the conveyor framework adjacent one of the ends thereof.

6. The combination of claim 1 wherein the conveyor is a grain conveyor.

7. The combination of claim 6 wherein the grain conveyor is an auger conveyor.

8. The combination of claim 6 wherein the grain conveyor is a belt conveyor.

9. The combination of claim 1 wherein a pair of drive wheels are operatively connected to said drive axle.

10. The combination of claim 1 wherein said power means is remotely controlled.

11. The combination of claim 1 wherein said power means is a battery powered drive motor.

12. The combination of claim 1 wherein said power means is an engine.

13. The combination of claim 1 wherein said power means is an electric motor.

14. The combination of claim 1 wherein said power means is a gear motor.

15. The combination of claim 1 further including a pivotal steer wheel assembly operatively secured to the lower end of the conveyor.

16. In combination with a belt conveyor, including a conveyor tube having upper and lower ends, supported by a framework including an elongated transversely extending axle having a first support wheel rotatably mounted at one end thereof and a second support wheel rotatably mounted on the other end, comprising:
   a powered conveyor mover secured to the conveyor framework for moving the conveyor in a forwardly or rearwardly direction;
   a steer wheel assembly operatively secured to the lower end of the conveyor tube;
   said steer wheel assembly comprising:
      (a) an extendable jack, having upper and lower ends, which is movable between extended and retracted positions;
      (b) said upper end of said jack being secured to one side of the conveyor tube;
      (c) a steer wheel support having inner and outer ends;
      (d) said outer end of said steer wheel support being secured to said lower end of said jack;
      (e) a rotatable steer wheel pivotally secured to said inner end of said steer wheel support about a vertical axis;
      (f) said steer wheel being positioned directly below said conveyor tube;
      (g) and an elongated steer wheel arm operatively secured to said steer wheel for pivotally moving said steer wheel with respect to said steer wheel support.

* * * * *